(12) United States Patent
Jahn et al.

(10) Patent No.: US 6,288,373 B1
(45) Date of Patent: Sep. 11, 2001

(54) APPARATUS FOR AMORPHOUS BONDING OF TUBULARS

(75) Inventors: Michael Jahn, Hambühren/Oldau; Bernd-Georg Pietras, Wedemark, both of (DE)

(73) Assignee: Shell Research Limited, Cheshire (GB)

( * ) Notice: Subject to any disclaimer, the term of this patent is extended or adjusted under 35 U.S.C. 154(b) by 0 days.

(21) Appl. No.: 09/485,546

(22) PCT Filed: Aug. 19, 1998

(86) PCT No.: PCT/EP98/05474
§ 371 Date: Feb. 14, 2000
§ 102(e) Date: Feb. 14, 2000

(87) PCT Pub. No.: WO99/08827
PCT Pub. Date: Feb. 25, 1999

(30) Foreign Application Priority Data

Aug. 19, 1997 (GB) .................................... 9717440
Mar. 17, 1998 (GB) .................................... 9805661

(51) Int. Cl.[7] .................................................. B23K 13/01
(52) U.S. Cl. ........................................ 219/607; 219/635
(58) Field of Search ................................... 219/607, 603, 219/614, 615, 616, 617, 635, 544, 535, 61; 156/304.2; 285/21.2, 41

(56) References Cited

U.S. PATENT DOCUMENTS 5,975,405 * 11/1999 Tsuchiya et al. .................. 228/44.5
6,078,031 * 6/2000 Bliault et al. ....................... 219/607
6,184,493 * 2/2001 Tsuchiya ............................. 219/161

* cited by examiner

Primary Examiner—Teresa Walberg
Assistant Examiner—Quang Van

(57) ABSTRACT

An apparatus for amorphous bonding of tubulars (110,111) comprises a double skin jacket (2,113,114) which can be placed around said tubulars (110,111) which skins define a sealed inner fluid space (11,121) which contains shield gas and a heating element (1,129) and a sealed outer fluid space (9,119) surrounding the inner fluid space (11,121) to reduce the risk of explosion during the amorphous bonding process.

9 Claims, 3 Drawing Sheets

APPARATUS FOR AMORPHOUS BONDING OF TUBULARS

BACKGROUND OF THE INVENTION

This invention relates to an apparatus for amorphous bonding of tubulars.

During the construction of oil and gas wells it is usual to connect a large number of tubulars. Conventionally this is effected by screw couplings. One of the disadvantages of this construction is that the couplings are prone to corrosion with the result that a whole string of tubulars may have to be replaced every few years, particularly in high temperature, high pressure wells containing corrosive vapours.

It has been suggested that the longevity of such tubulars could be greatly increased, perhaps up to 25 years, if the couplings could be dispensed with.

One proposal for dealing with this problem has been to weld tubulars together. However, this is extremely hazardous at the head of an oil or gas well. Furthermore, normal manual welding does not result in a homogeneous metallurgical structure and the corrosion problem remains.

A technique of joining metal components known as "amorphous bonding" has been successfully utilised in the automotive industry. The surfaces of the components to be joined are ground into parallism. A foil of a metal alloy is then placed between the components which are mechanically pressed together. The joint is then subjected to local heating by an induction heater. The resulting structure is nearly metallurgically homogeneous.

It will be appreciated that it would be extremely desirable to be able to join tubulars by amorphous bonding. However, the technical difficulties are daunting insofar as it is necessary to transfer a process suited to a precision engineering shop to an area where inflammable and often explosive gas mixtures are present and where the rigidity of an engineering shop floor is replaced by a drilling platform which may well be offshore and which may be in continuous motion in heavy seas and inclement weather.

It is observed that UK patent specification No. 540,519 discloses a welding device comprising a ring burner which is surrounded by an annular water cooling jacket to reduce explosion hazards during the welding process.

European patent application No. 157131 discloses a double chambered sealing system for welding pipe end which injects inert shield gas in radial and axial directions into unsealed areas around the welding zone to prevent air contamination of said zone.

European patent application No. 418606 discloses an amorphous bonding apparatus in which nitrogen shield gas is injected into a jacket surrounding the bonded tubular ends and also nitrogen gas is injected into the interior of the bonded tubulars to create a virtually oxygen free atmosphere in the region of the bond.

Although the known devices provide some protection against explosion hazards they do not provide sufficient protection in an hazardous environment at the head of an oil or gas well.

The present invention is primarily concerned with reducing the risk of explosion while the amorphous bonding is taking place.

SUMMARY OF THE INVENTION

According to the present invention there is provided an apparatus for amorphous bonding the ends of tubulars which are in substantial axial alignment and surrounded by a shield gas, said apparatus comprising a jacket which in use is placed around said adjacent tubular ends, said jacket having an inner skin which, in use, defines a sealed inner fluid space containing a heating element and shield gas, and an outer skin which surrounds the inner skin such that in use a sealed outer fluid space is defined between said inner and outer skin.

It is preferred that said jacket is formed by two parts which are slidably mounted on a support frame and which can be urged together to form said jacket and that the inner skin is provided with fluid communication means which allow in use fluid to flow in a controlled manner from the inner fluid space into the outer fluid space or vice versa.

In one embodiment the apparatus comprises means to introduce a shield gas into the inner fluid space and means to introduce water into the outer fluid space and the fluid communication means comprises a conduit which, in use, can convey said shield gas to within said outer fluid space at a selected depth between the water level in the outer fluid space so that a selected pressure difference is maintained between the inner and outer fluid spaces.

In an alternative embodiment the apparatus comprises an inlet pipe for introducing a shield gas into the outer fluid space, an orifice in the inner skin for allowing the shield gas to flow from the outer fluid space into the inner fluid space and an outlet pipe for allowing the shield gas out of the inner fluid space, wherein preferably pressure control means are provided which in use control the pressure in the inner and outer fluid space such that the pressure in the inner fluid space is higher than the ambient pressure and the pressure in the outer fluid space is higher than in the inner fluid space. In this manner a high pressure gas shield is created in the outer fluid space which prevents air to flow into the inner fluid space and hot shield gases to leak from the inner fluid space into the atmosphere.

Suitably the apparatus further comprises a packer which in use is inserted into the interior of the tubular ends that are bonded by the apparatus, which packer comprises an elongate mandrel having a resilient packer element adjacent each end thereof, means to enable an inert shield gas to be introduced into an end of said elongate mandrel and to leave said elongate mandrel between said resilient packer elements, and means to enable water to be introduced into said end of said elongate mandrel and to leave said elongate mandrel between said resilient packer elements.

It will be understood that the external double skin jacket and the internal packer provide an adequate protection against explosion hazards during the amorphous bonding process since they prevent explosive gases to reach the area of the heating element and the tubular ends heated thereby and also prevent hot shield gases or other fluids to escape into the surrounding atmosphere.

BRIEF DESCRIPTION OF THE DRAWINGS

For a better understanding of the present invention reference will now be made, by way of example, to the accompanying drawings, in which.

DETAILED DESCRIPTION OF THE INVENTION

Figure 1:
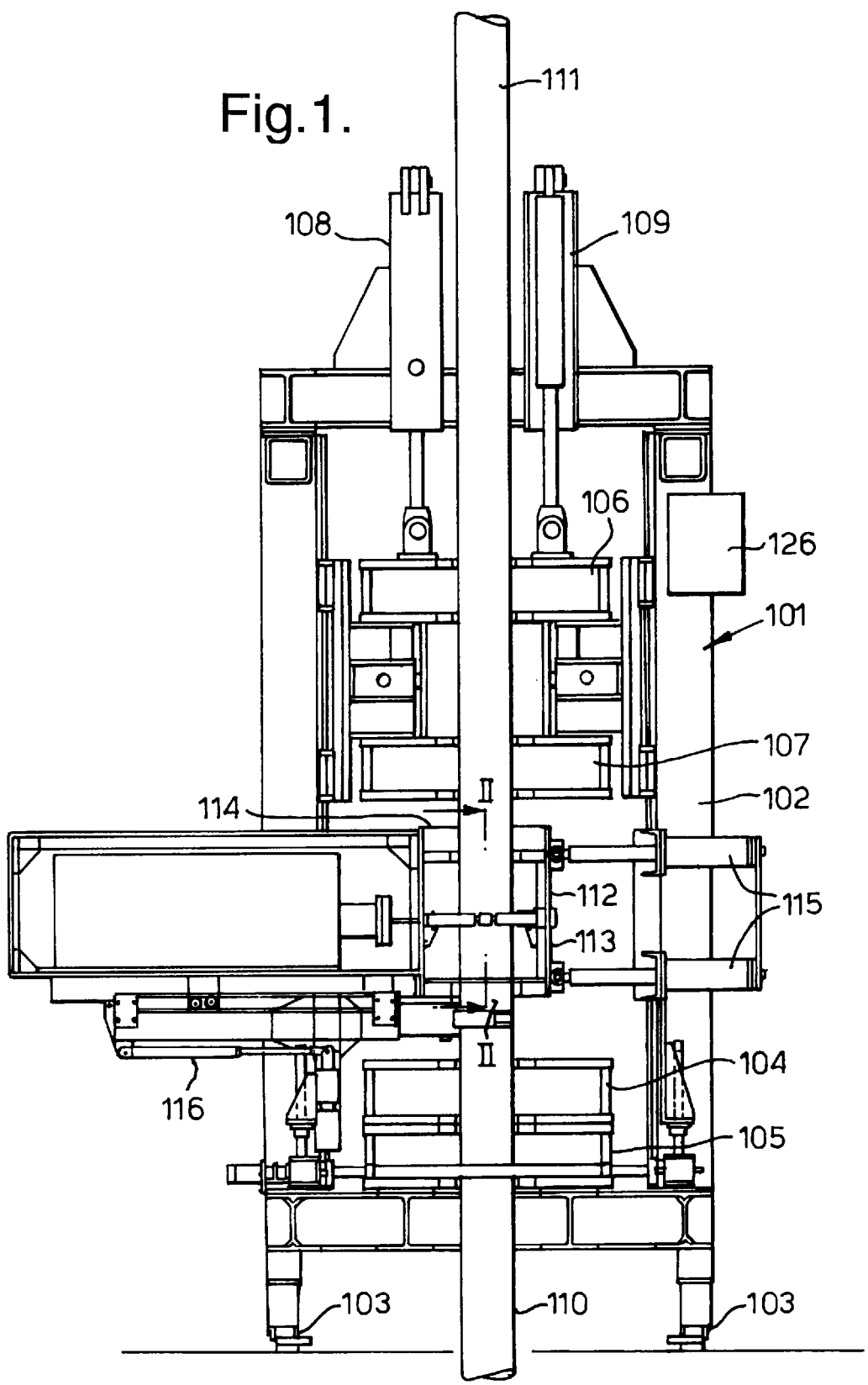
FIG. 1 is a vertical section through an amorphous apparatus according to the present invention.

Referring to FIG. 1 there is shown an amorphous bonding apparatus which is generally identified by reference numeral 101.

The amorphous bonding apparatus 101 comprises a support frame 102 which is provided with wheels 103 which run in channels (not shown).

Two clamps 104 and 105 are disposed towards the bottom of the support frame 102 whilst another two clamps 106 and 107 are mounted near the top of the support frame 102 and can be displaced vertically by two piston-and-cylinder assemblies 108 and 109.

In use, a lower tubular 110 is secured in slips (not shown). The support frame 102 is then advanced towards the lower tubular 110 and the clamps 104 and 105 secured thereto.

An upper tubular 111 is then maneuvered into position using an elevator or a positioning device and gripped in the clamps 106 and 107. The piston-and-cylinder assemblies 108 and 109 are then actuated to bring the lower end of the upper tubular 111 into close proximity to the upper end of the lower tubular 110. The adjacent ends of the upper and lower tubulars are then brought into substantial alignment and machined such that the adjacent ends are substantially flat and parallel to each other.

Then a foil of alloy is placed on the upper surface of the lower tubular 110 and the upper tubular 111 is urged downwardly by the piston and cylinder assemblies 108, 109 with a predetermined pressure which varies according to the composition of the tubulars and the composition of the foil.

At this point the sealable beating apparatus 112 is mounted on the tubulars straddling the foil. The sealable heating apparatus 112 comprises two halves 113 and 114 which can be advanced and retracted by hydraulic rams. In particular, the half 113 can be advanced and retracted by hydraulic rams 115 while the half 113 can be advanced and 114 can be advanced and retracted by hydraulic rams 116.

Figure 2:
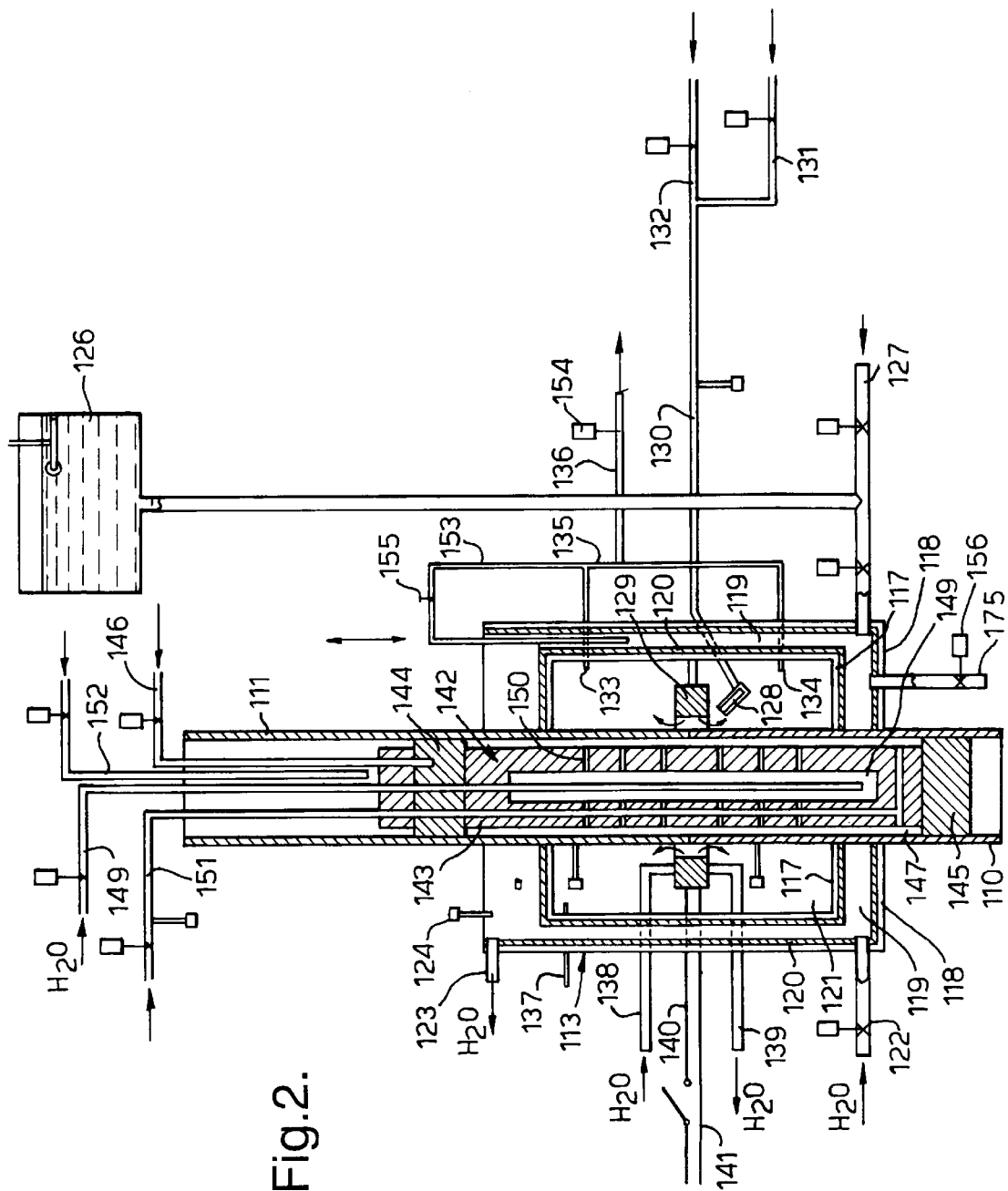
FIG. 2 shows, to an enlarged scale, a view on line II—II of FIG. 1.

As can be seen from FIG. 2 the half 113 comprises an inner skin 117 and an outer skin 118 which define an outer fluid space 119 therebetween. The faces of the inner skin 117 and the outer skin 118 are each provided with resilient seals 120 which engage on sealing surfaces on the half 114 and together define a jacket which surrounds the lower tubular 110 and the upper tubular 111. The resilient seals 120 also extend around the lower tubular 110 and the upper tubular 111 respectively. As indicated above, after the ends of the lower tubular 110 and the upper tubular 111 have been prepared for bonding a film of a suitable alloy is placed therebetween and the upper tubular 111 pressed against the lower tubular 110.

The halves 113 and 114 are then moved into position either side of the tubulars 110, 111 and pressed together with the hydraulic rams so as to form an inner chamber 121 enclosed by the inner skin 117. The two halves 113 and 114 are then fastened together with six mechanical fasteners (not visible) to ensure that the halves do not inadvertently come apart.

The outer fluid space 119 is then filled with water ($H_2O$) from inlet pipe 122. The water fills the outer fluid space 119 and leaves through outlet pipe 123. The water is continually pumped through the outer fluid space 119 and its presence is detected by a sensor 124 which is designed to inhibit the remainder of the process if no water is present or the temperature of the water exceeds a predetermined temperature.

The outer fluid space 119 can be emptied via drain line 125. An emergency water tank 126 and emerging water supply 127 are provided so that the outer fluid space 119 can be deluged with water in an emergency, for example catastrophic failure of a. seal resulting in loss of water from the outer fluid space 119.

The inner fluid space or chamber 121 is cooled by a flow of shield gas which is introduced through a manifold 128 situated below an induction heating ring 129. The shield gas is supplied via gas supply pipe 130 which is, in turn, connected to a source of compressed air via air line 131 and a source of argon shield gas via argon line 132.

The inner chamber 121 is also provided with two gas exit pipes 133, 134 which are connected to an exit manifold 135. The exit manifold 135 is connected to an argon flushing line 136 and a line 153 which opens into the outer fluid space 119 well below outlet pipe 123.

A sampling pipe 137 is provided to allow samples of gas from within the inner chamber 121 to be continually taken and analysed.

The induction heating ring 129 is independently water ($H_2O$) cooled by a water supply which is pumped through inlet pipe 138 and leaves through outlet pipe 139. The induction heating ring 129 is provided with power via heavy metal conduits which are symbolised by wires 140 and 141.

While the heating apparatus 112 is being prepared an internal packer 142 is lowered down the upper tubular 111. The purpose of the internal packer 142 is threefold, viz:

(1) to prevent inflammable, and possibly explosive, vapour rising up the lower tubular 110;

(2) prevent air coming down the upper tubular 111; and (3) allow a desired atmosphere to be created in the vicinity of the joint.

With these purposes in mind the internal packer 142 comprises an elongate mandrel 143 with a resilient packer element 144, 145 at each end thereof. Each resilient packer element 144, 145 is connected to a source of pressurized water via packer element control line 146. When pressurized water is supplied through packer element control line 146 both the packer elements 144, 145 expand and form a seal between the elongate mandrel 143 and the upper tubular 111 and lower tubular 110 respectively thereby forming an isolated chamber 147.

The centre of the elongate mandrel 143 is provided with an elongate bore 148 which is connected to a water ($H_2O$) inlet tube 149 and is provided with a multiplicity of radial outlet tubes 150 which open into the isolated chamber 147. An argon supply pipe 151 also passes downwardly through the elongate mandrel 143 and opens into the isolated chamber 147 immediately above the resilient packer element 145.

After the apparatus 112 has been properly positioned, the internal packer 142 positioned, and the resilient packer elements 144, 145 set, the amorphous bonding process proceeds as follows:

1. Water flow is established through the outer fluid space 119.

2. The inner chamber 121 is purged with air for a fixed time and in any event until the gas sampled through the safety device 137 does not record an unacceptable level of hydrocarbons.

3. The air supply is switched off and argon is passed through the inner chamber 121 to form an atmosphere of argon shield gas to the outside of the joint.

4. When the sample of gas being taken through the sampling pipe 137 indicates that the atmosphere in the inner chamber 121 is substantially pure argon the inner chamber 121 is ready. During steps 3 and 4 argon leaves the system via argon flushing line 136 and can, if desired, be recovered for use in other application.

5. During steps 2, 3 and 4 the isolated chamber 147 is purged by the introduction of argon shield gas through argon supply pipe 151. The argon purges the isolated chamber 147 and leaves via an outlet tube (not visible). A sensor in the outlet tube checks the argon content of the gas passing through the outlet tube and inhibits activation of the induction heating ring 129 until the gas passing through the outlet tube is substantially pure argon. Air is also introduced into the upper tubular 111 via pipe 152 to purge any combustible gases from inside the upper tubular.

6. At this stage power is applied to the induction heating ring 129 to heat the metal in the area of the joint to a temperature in the range of about 1000–1300° C. for a predetermined period. However, safety requirements necessitate the surrounding area being kept as cool as practicable. With this in mind argon is pumped through the inner chamber 121 and the isolated chamber 147 throughout the heating process. Furthermore, air is pumped through the pipe 152.

The argon which leaves the inner chamber 121 via gas exit pipes 133, 134 is directed through line 153 by closing valves 154 and opening 155. The argon bubbles through the water and is cooled thereby before venting into the atmosphere. Furthermore, the pressure of argon in the inner chamber 121 can be controlled by varying the depth of the outlet of the line 153 below the water level. This provides a simple and effective method of controlling the pressure in the inner chamber 121.

After the requisite period the induction heating is ceased and the joint allowed to cool whilst the flow of argon continues.

When the joint has been cooled sufficiently the supply of argon through argon supply line 151 is terminated and cooling water is introduced through water inlet tube 149. The supply of water is continued until the tubulars 110 and 111 are suitably cooled at which time the supply of argon to the inner chamber 121 via gas supply pipe 130 is stopped. The supply of water to the outer fluid space 119 is also stopped and the outer fluid space 119 drained by opening a valve 156 in the drain line 125.

The halves 113 and 114 are then withdrawn.

Only when it is determined that it is safe to do so is the water supply to the packer 142 via water inlet pipe 149 terminated. The resilient packer elements 144, 145 are then deflated and the packer 142 withdrawn.

The tubulars 110 are then released from the clamps 104, 105 106, 107 and the amorphous bonding apparatus 101 rolled back.

The joint is then tested. If the test is successful the tubulars are lifted to enable the slips to be released and lowered into the hole. The slips are then applied and the process repeated.

Various modifications to the embodiment described are envisaged, for example air, or preferably, as described with reference to FIG. 3, an inert shield gas such as nitrogen could be circulated through the outer fluid space 119 instead of water. Instead of purging the isolated space 147 with argon it could be initially purged with air subsequently argon for the heating step. If desired, after the induction heating is completed and cooling has commenced the resilient packer element 144 (but not the resilient packer element 145) could be released prior to the introduction of cooling water. This would allow any steam found to rapidly escape and further purge the inside of the upper tubular.

Figure 3:
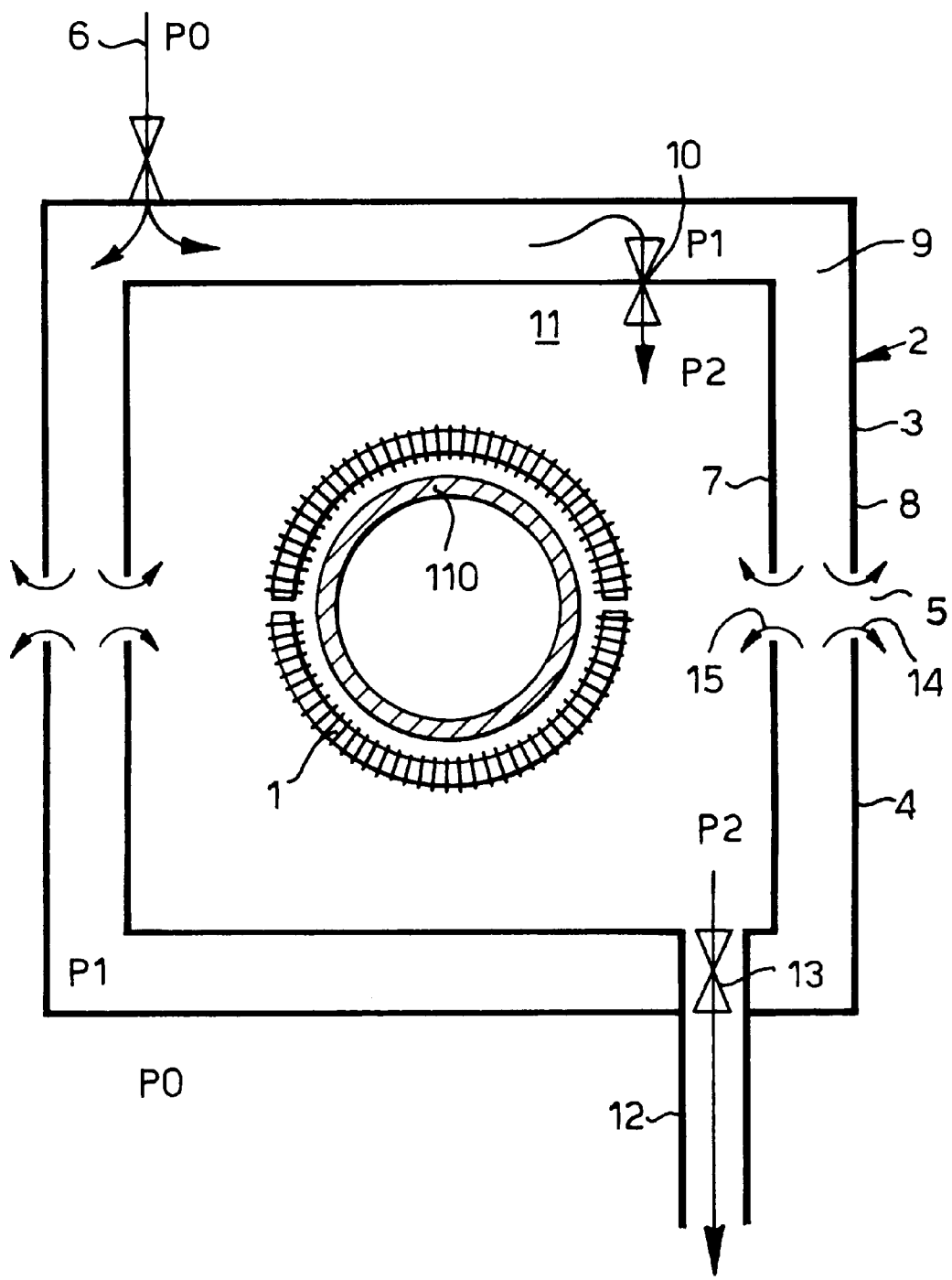
FIG. 3 shows a schematic cross-sectional view of an apparatus according to the present invention in which pressurized shield gas is injected via the outer fluid space into the inner fluid space and then vented into the atmosphere.

Turning now to FIG. 3 an amorphous bonding heating coil is identified by reference numeral 1.

The amorphous bonding heating coil 1 surrounds a tubular 110 and is surrounded by a jacket enclosure 2 having a first half 3 and a second half 4.

Each half 3, 4 comprises an inner skin 7 and an outer skin 8 defining an annular outer space 9 therebetween.

The halves 3 and 4 are provided with seals which interengage when the halves 3 and 4 are clamped together and which are intended to form the sealed jacket enclosure 2. However, to facilitate understanding the present invention it will be assumed that there is a small gap 5 between the halves 3, 4.

In use, an inlet pipe 6 conveys inert shield gas into the annular outer space 9 between the inner skin 7 and the outer skin 8. The annular outer fluid space 9 is maintained at a pressure P1 which is slightly greater than the ambient pressure P0. An orifice 10 allows part of the inert shield gas to pass into an inner fluid space 11 inside the inner skin 7. The inert gas can then pass from the inner fluid space 11 to an isolated outlet pipe 12 via an orifice 13 which is set to maintain the pressure P2 in the chamber 11 between P1 and P0.

In use, cool inert gas is passed through inlet pipe 6. Part of the cool inert gas passes into the annular outer fluid space 9 whilst the balance flows through the inner fluid space 11 via orifice 10 and orifice 13. When the induction heater 1 is operational the inert gas in the inner fluid space 11 is heated and the heated inert gas leaves via insulated outlet pipe 12 which vents to atmosphere in a safe area optionally after being indirectly cooled.

As can be seen from the arrows 14, 15 in the event of a leak in the outer skin 8 cool inert gas from the annular outer fluid space 9 passes through the gap into the ambient air since the pressure P1 in the space 9 is higher than the ambient pressure P0. Similarly, in the event of a leak in the inner skin 7 cool inert gas passes from space 9 through the inner skin 7 into the inner fluid space 11.

It will be appreciated that with the arrangement disclosed the probability of hot shield gases leaking to the atmosphere surrounding the enclosure 2 is small.

Various modifications to the embodiment claimed are envisaged, for example the inlet pipe 6 and the orifice 10 could be disposed to help ensure that the annular outer fluid space 9 is constantly replenished with cool inert gas, thus reducing the possibility of small pockets of hot inert gas accumulating in the outer fluid space 9. If desired several inlet pipes 6 and several orifices 10 could be provided.

It will be appreciated that the orifices 10 and 13 could be formed by adjustable valves or pressure relief valves.

If desired flow and temperature sensors may be provided which are arranged to stop the amorphous bonding process and drench the entire area with water if a signal is detected indicative of a major leak.

Such sensors could comprise flow sensors in the inlet pipe 6 and the insulated outlet pipe 12.

What is claimed is:

1. An apparatus for amorphous bonding an end of a first tubular with a substantially adjacent end of a second tubular, wherein said tubulars are in substantial axial alignment and surrounded by shield gas, said apparatus comprising a jacket which in use is placed around the adjacent tubular ends, said jacket having an inner skin which, in use, defines a sealed inner fluid space containing a heating element and shield gas, and an outer skin which surrounds the inner skin such that in use a sealed outer fluid space is defined between said inner and outer skin.

2. An apparatus as claimed in claim 1, wherein said jacket is formed by two parts which are slidably mounted on a support frame and which can be urged together to form said jacket.

3. An apparatus as claimed in claim 1, wherein the inner skin is provided with fluid communication means which allow in use fluid to flow in a controlled manner from the inner fluid space into the outer fluid space or vice versa.

4. An apparatus as claimed in claim 1, including means to introduce shield gas into the inner fluid space and means to introduce fluid into the outer fluid space and wherein the fluid communication means comprises a conduit which, in use, can convey shield gas to within said outer fluid space at a selected depth below the fluid level in the outer fluid space.

5. An apparatus as claimed in claim 1, including a sensor operative, in use, to inhibit amorphous bonding of said tubulars if there is insufficient fluid in the outer fluid space.

6. An apparatus as claimed in claim 1 comprising an inlet pipe for introducing shield gas into the outer fluid space, an orifice in the inner skin for allowing the shield gas to flow from the outer fluid space into the inner fluid space and an outlet pipe for allowing the shield gas out of the inner fluid space.

7. An apparatus as claimed in claim 1, further comprising pressure control means which in use control the pressure in the inner and outer fluid space such that the pressure in the inner fluid space is higher than the ambient pressure and the pressure in the outer fluid space is higher than in the inner fluid space.

8. An apparatus as claimed in claim 2, wherein at least two clamps are mounted on said support frame, one of said clamps being adapted to grip a lower tubular and the other of said clamps being adapted to grip an upper tubular, and means for displacing one of said clamps relative to the outer so that said tubulars can be urged towards one another.

9. An apparatus as claimed in claim 8, further comprising a packer which in use is inserted into the interior of the tubular ends that are bonded by the apparatus, which packer comprises an elongate mandrel having a resilient packer element adjacent each end thereof, means to enable a shield gas to be introduced into an end of said elongate mandrel and to leave said elongate mandrel between said resilient packer elements, and means to enable water to be introduced into said end of said elongate mandrel between said resilient packer elements.

* * * * *